(12) United States Patent

Mueller et al.

(10) Patent No.: US 9,490,082 B2
(45) Date of Patent: Nov. 8, 2016

(54) BICYCLE HANDLE SYSTEM

(71) Applicant: RTI Sports Vertrieb von Sportartikeln GmbH, Koblenz (DE)

(72) Inventors: Michael Mueller, Siershahn (DE); Andreas Krause, Koblenz (DE)

(73) Assignee: RTI SPORTS VERTRIEB VON SPORTARTIKELN GMBH, Koblenz (DE)

( * ) Notice: Subject to any disclaimer, the term of this patent is extended or adjusted under 35 U.S.C. 154(b) by 186 days.

(21) Appl. No.: 14/211,964

(22) Filed: Mar. 14, 2014

(65) Prior Publication Data

US 2014/0260752 A1   Sep. 18, 2014

(30) Foreign Application Priority Data

Mar. 15, 2013 (DE) .................. 20 2013 002 492

(51) Int. Cl.
```
G05G 1/00      (2006.01)
H01H 3/00      (2006.01)
B62M 6/45      (2010.01)
B62K 23/04     (2006.01)
```
(52) U.S. Cl.
CPC ............. *H01H 3/00* (2013.01); *B62K 23/04* (2013.01); *B62M 6/45* (2013.01); *Y10T 74/20256* (2015.01)

(58) Field of Classification Search
CPC .... Y10T 74/20256; H01H 3/00; B62M 6/45; B62K 23/04
USPC ....... 74/473.24, 473.25, 473.26, 484 R, 491; 180/206.1, 206.2, 206.3, 315
See application file for complete search history.

(56) References Cited

U.S. PATENT DOCUMENTS

| 5,524,501 | A  | * | 6/1996  | Patterson  | B62K 21/26 74/473.25 |
| 5,662,000 | A  | * | 9/1997  | Patterson  | B62K 21/26 74/473.26 |
| 5,802,927 | A  | * | 9/1998  | Yu         | B62K 23/04 74/489   |
| 6,144,125 | A  | * | 11/2000 | Birkestrand | B62K 23/04 180/206.2 |
| 6,342,769 | B1 | * | 1/2002  | Birkestrand | B62M 6/40 180/206.2 |
| 7,841,255 | B2 | * | 11/2010 | Fujii       | B62K 23/04 200/61.85 |

(Continued)

FOREIGN PATENT DOCUMENTS

DE   202012104005 U1   12/2012
EP   0896921 A1        2/1999

(Continued)

*Primary Examiner* — William Kelleher
*Assistant Examiner* — Zakaria Elahmadi
(74) *Attorney, Agent, or Firm* — Ohlandt, Greeley, Ruggiero & Perle, LLP

(57) ABSTRACT

Next to a handle element, a bicycle handle system comprises a control element adapted to be fastened on the handlebar and serving to control an electric auxiliary motor. The control element has an actuation element rotatable on a bearing element. By turning the actuation element from a rest position to in particular two different activation positions, the assisting power from the auxiliary motor can be increased or reduced. For a simple, intuitive actuation of the actuation element, a return element is provided by which the actuation element is automatically returned from the first and, if applicable, the second activation position to a rest position.

13 Claims, 1 Drawing Sheet

(56) References Cited

U.S. PATENT DOCUMENTS

| | | | | |
|---|---|---|---|---|
| 2003/0221506 A1* | 12/2003 | Wesling | ............ | B62K 23/04 74/501.6 |
| 2004/0261560 A1* | 12/2004 | Tsai | ............ | B62K 23/04 74/473.25 |
| 2006/0053937 A1* | 3/2006 | Chen | ............ | B62K 23/04 74/501.6 |
| 2010/0313696 A1* | 12/2010 | Vellutini | ............ | B62K 23/06 74/491 |
| 2012/0006146 A1* | 1/2012 | Warren | ............ | G05G 1/04 74/524 |
| 2013/0036654 A1* | 2/2013 | Goosey | ............ | A01K 85/01 43/42.31 |
| 2015/0102580 A1* | 4/2015 | Kuo | ............ | B62M 11/145 280/261 |
| 2015/0108734 A1* | 4/2015 | Kim | ............ | B62M 17/00 280/233 |

FOREIGN PATENT DOCUMENTS

| | | |
|---|---|---|
| EP | 1630095 A2 | 3/2006 |
| WO | 2005021366 A1 | 3/2005 |

* cited by examiner

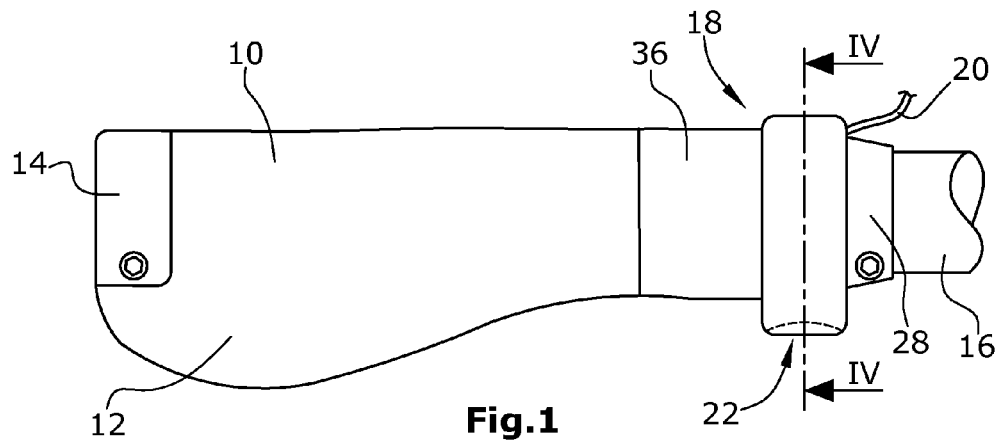
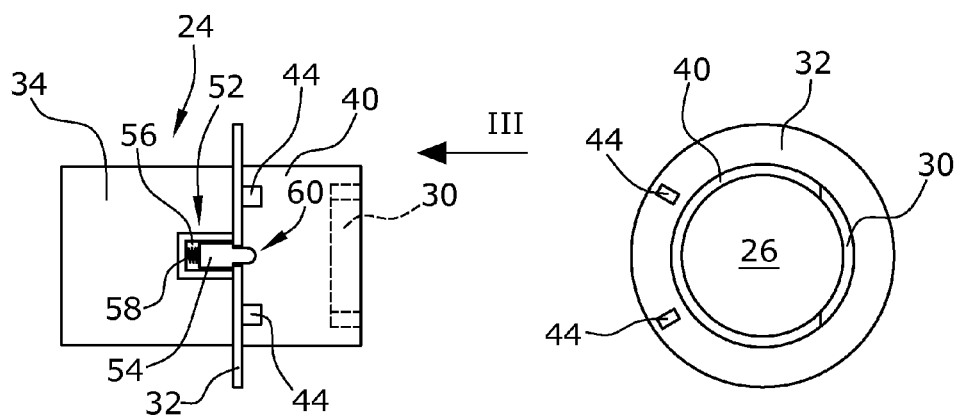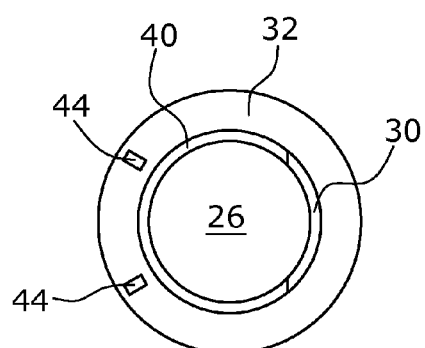
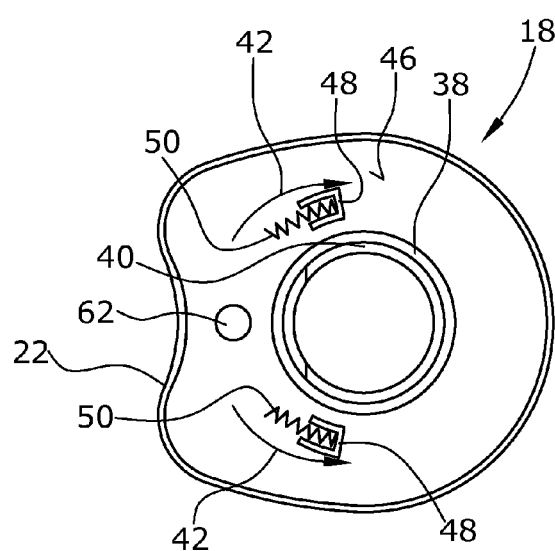

BICYCLE HANDLE SYSTEM

CROSS REFERENCE TO RELATED APPLICATIONS

The present disclosure claims the priority of German Utility Model Application no. DE 20 2013 002 492.5 filed on Mar. 15, 2013, the disclosures of which are incorporated herein by reference.

BACKGROUND

1. Field of the Disclosure

The disclosure relates to a bicycle handle system for fastening to a bicycle handlebar.

2. Description of the Prior Art

The handlebars of electrically assisted bicycles are provided with control elements for controlling the electric motor. These control elements are fastened on the handlebar by clamping, for example. Since these are control elements that are independent of the handle, they can be mounted on the handlebar laterally next to the conventional bicycle handle. Such control elements have the disadvantage that their operation often requires taking a hand from a bicycle handle. It is necessary to at least partially release the handle, for instance, in order to actuate a switch on the control element with the thumb. This means a reduction in safety, since, for example, when riding over a bump or the like, there is a risk of the hand slipping from the handle. Moreover, the ergonomics of such control elements is not or only slightly adapted to the posture of the hand of a user while riding on a bicycle. With such control elements, the motor is controlled by means of switches, wherein it is preferably possible to increase the assistance provided by the motor e.g. by pressing one switch and to decrease the same by means of the other switch. This has the disadvantage that no intuitive control by the user is possible; rather, the control element has to be looked at in order to actuate the correct switch.

SUMMARY

It is an object of the disclosure to provide a bicycle handle system, in which a control element can be actuated in a simple manner.

The bicycle handle system of the disclosure comprises a handle element adapted to be mounted to or on a bicycle handlebar. According to the disclosure, a control element for controlling electric auxiliary motor of the bicycle is provided in particular laterally next to the handle element that may be slightly shorter than conventional handles, if need be. In the mounted state, the control element is preferably arranged within the handle element so that it is preferably possible to actuate the control element in particular with the thumb without having to release the hand from the handle element. The control element allows changing the assisting power of the auxiliary motor. According to the disclosure, the control element comprises an actuation element. The actuation element is rotatably connected with a bearing element. For example, the bearing element can be sleeve-shaped or have a sleeve-shaped extension and be fixed on the bicycle handlebar either directly or indirectly. Thereby, the actuation element can be rotated on the bearing element. A rotation of the actuation element on or in the bearing element, a rotation of the actuation element relative to the bearing element, causes an actuation of the electric switching element.

For an actuation of the auxiliary motor, the actuation element can be rotated from a rest position to at least one activation position. According to the disclosure, a return element is provided for turning the actuation element back from the at least one activation position to the rest position, in particular in a self-acting or automatic manner. This is advantageous in that an intuitive actuation of the actuation element is possible, since the actuation element is automatically turned back to its rest position as soon as the user has taken in particular the thumb or another finger, with which he has actuated the actuation element, from the latter. Thus, the actuation element is in its rest position again for the next actuation and can be operated by the user in an intuitive manner, especially without having to look at the actuation element.

In a preferred embodiment, the return element comprises a spring element such as an elastic body, a coil spring or the like. Preferably, the spring element is arranged between the actuation element and the bearing element or between the actuation element and a fixing element mounted on the handlebar. When the actuation element is turned from the rest position, the spring element is deformed thereby. Thus, a restoring force is generated so that the actuation element is automatically turned back to the rest position as soon as it is released.

In a particularly preferred embodiment of the disclosure it is possible to turn the actuation element from a rest position to a first and a second activation position. Relative to the rest position, the two activation positions are preferably situated in opposite senses of rotation. In this manner, it is possible, for example, to effect an increase in the assisting power of the auxiliary motor by turning the actuation element in the upward direction, while turning it in the downward direction causes a reduction in the assisting power. A return from the first, as well as from the second activation position to the rest position can be achieved with the aid of a spring element which is either compressed or extended, depending on the direction in which the actuation element is turned. It is preferred to provide two spring elements that each generate a restoring force. This further has the advantage that, in the rest position, the actuation element is held in a simple manner by the two spring elements. One or both of the spring elements are preferably arranged such that they extend substantially in the circumferential direction of the actuation element and/or the bearing element. In particular, the one or both spring elements extend in the circumferential direction of the handlebar.

In a particularly preferred development of the disclosure, a retaining element is further provided which retains the actuation element in the rest position. The retaining element effects a defined retention of the actuation element in the rest position. Owing to the retaining element, the position of the actuation element in the rest position is defined in an unambiguous manner so that a simple actuation of the actuation element is possible, especially by means of the thumb. In a particularly preferred embodiment, the retaining element is provided in addition to two spring elements acting in mutually opposite directions so that after the user has released the actuation element the spring elements automatically turn it back to the rest position in which it is retained.

Preferably, the retaining element comprises a retaining pin or a retaining stud that engages a retaining depression or a retaining recess when in the rest position. For example, the retaining pin may comprise a spherical or a hemispherical end engaging a complementary, also spherical or hemispherical recess or retaining depression. In this regard, the radius of the retaining depression may be selected larger than that of the retaining pin so that the retaining pin slides into the retaining depression, as it were, as soon as the actuation element is close to the rest position. Thus, the retaining element allows an exact positioning in the rest position. The retaining pin may be elastic or spring-loaded. The spring loading, effected by means of an elastic body or a spring, preferably acts in the direction of the retaining depression. The retaining pin is preferably provided at the bearing element or at the fixing element arranged on the handlebar. In this arrangement, the retaining depression is provided in the actuation element. The arrangement of the retaining pin and the retaining depression can also be inversed.

In a particularly preferred development of the disclosure, the actuation element comprises a sliding element arranged for rotation on the bearing element. In this embodiment, the sliding element forms a plain bearing together with the bearing element. As an alternative, rolling elements, such as balls, can be provided between these two elements. It is particularly preferred that the bearing element has a cylindrical inner diameter that substantially corresponds to the outer diameter of the bicycle handlebar so that the bearing element can be fixed on the bicycle handlebar in a simple manner, for example by means of a clamping means such as a clip or the like. The fixation of the bearing element can also be achieved through a connection with the handle element which in this case will be fixed on the bicycle handlebar. A preferred embodiment of the outer surface of the bearing element forming the sliding surface is preferably also shaped substantially cylindrically. Correspondingly, it also preferred that the sliding element has a substantially cylindrical inner surface directed towards the bearing element. In this regard, it is preferred that the sliding element is formed integrally with the control element, in particular as an injection molded part.

In order to achieve the simplest possible actuation of the control element, in particular a simple turning of the control element on the bearing element, the actuation element comprises a switching depression. In the mounted state, the latter is directed in particular in the direction of the user so that it is possible, in a simple manner, to actuate the control element with the thumb via the corresponding switching depression without having to take the hand off the bicycle handle. Instead of a switching depression, it is possible to provide a switching tab, for instance, which is directed in particular towards the user and can be actuated in particular with the thumb.

BRIEF DESCRIPTION OF THE DRAWINGS

A full and enabling disclosure of the present disclosure, enabling one of ordinary skill in the art to carry out the disclosure, is set forth in greater detail in the following description, including reference to the accompanying drawing in which FIG. 1 is a schematical top plan view of a bicycle handlebar together with a control element, FIG. 2 is a schematic top plan view of the bearing element, FIG. 3 is a schematic side elevational view of the bearing element in the direction of the arrow III in FIGS. 2, and FIG. 4 is a schematic sectional view of the control element and the bearing element along line IV-IV in FIG. 1.

DESCRIPTION OF THE PREFERRED EMBODIMENTS

The drawing figures are intended to illustrate the general manner of construction and are not necessarily to scale. In the detailed description and in the drawing figures, specific illustrative examples are shown and herein described in detail. It should be understood, however, that the drawing figures and detailed description are not intended to limit the disclosure to the particular form disclosed, but are merely illustrative and intended to teach one of ordinary skill how to make and/or use the disclosure claimed herein.

In a preferred embodiment of the bicycle handle system of the present disclosure a handle element 10 is provided. The handle element 10 has a protrusion 12 for supporting the palm of the hand and is fastened on the bicycle handle bar by a clamping means 14. Such a handle element is described in EP 1 537 014, for example. The handle element is fixed on the handlebar by means of the clamping means 14. An actuation element 18 is arranged on a side that is the inner side with respect to the handle element 10. The actuation element 18 is at least partially pivotable or rotatable about the handlebar 16. Thereby, an electric switch is actuated that controls an auxiliary motor connected with the control element via a wire 20. The connection may also be wireless. In the embodiment illustrated, the actuation element 18 is turned by means of a thumb placed in a switching depression 22 of the actuation element and by moving the thumb upward or downward.

The actuation element 18 is arranged on a bearing element 24 (FIG. 2). The bearing element 24 has a cylindrical opening 26 (FIG. 3) having the outer diameter of the handlebar 16. By means of a fixing element 28 (FIG. 1) in the form of a clamp in cooperation with a recess 30 in the bearing element, the bearing element 24 can be fixed on the handlebar 16. The actuation element 18 is arranged on the right or inner side of an annular abutment ring 32, as illustrated in FIG. 2. An opposite cylindrical part 34 of the bearing element 24 either protrudes directly into the handle element 10 or is partially surrounded by another, substantially cylindrical handle part 36 so that the cylindrical extension 34 protrudes only partially into the handle element 10. For example, other electronic components or the like can be housed in the cylindrical handle part 36.

In the embodiment illustrated the actuation element 18 comprises an inner cylindrical extension 38 forming a sliding element. The same surrounds the cylindrical extension 40 of the bearing element 24 so that it is possible to turn or pivot the control element on the cylindrical extension 40 of the bearing element 23 as indicated by the arrows 42. In the embodiment illustrated, the actuation element 18 is actuated using the thumb placed in the depression 22.

Two tabs 44 are provided on the abutment ring 32 of the bearing element 24. On a lateral surface 46 of the actuation element 18 facing to the annular element 32, two tabs 48 of U-shaped cross section are provided. In these, the two spring elements 50 are arranged which, in this example, form the return element. The free ends of the spring elements 50, illustrated in FIG. 4, abut on the tabs 44. In the rest position of the actuation element illustrated in FIG. 4, the same can be moved upward in the clockwise direction, using the thumb. Thereby, a switching element not illustrated in detail effects a switching of the auxiliary motor to increase the assisting power. When the actuation element 18 is turned clockwise, the upper spring element 50 in FIG. 4 is compressed. As soon as the thumb is taken from the switching depression, the upper spring 50 is automatically decompressed and thereby the actuation element is turned back from this, for example, first activation position to the rest position illustrated in FIG. 4. Likewise, when the actuation element is turned counterclockwise, the lower spring element 50 in FIG. 4 is compressed, and as soon as the thumb is removed, this spring element also decompresses so that the actuation element 18 is also automatically turned back from this second activation position to the rest position illustrated in FIG. 4.

In order to ensure that the actuation element 18 stays safely in the rest position, a retaining element 52 (FIG. 2) is additionally provided in a preferred embodiment. In the embodiment illustrated, the retaining element comprises a retaining pin 54. In FIG. 2, the retaining pin 54 can be pushed to the left into a housing pocket 56. There, a spring element 58 is compressed. The retaining element is spring-loaded by the spring element 58. In the rest position, the head 60 of the retaining pin 54 is arranged in a retaining depression 62 (FIG. 4) of the actuation element.

Although the disclosure has been described and illustrated with reference to specific illustrative embodiments thereof, it is not intended that the disclosure be limited to those illustrative embodiments. Those skilled in the art will recognize that variations and modifications can be made without departing from the true scope of the disclosure as defined by the claims that follow. It is therefore intended to include within the disclosure all such variations and modifications as fall within the scope of the appended claims and equivalents thereof.

What is claimed is:

1. A bicycle handle system comprising:
   a control element for controlling an electric auxiliary motor, said element being adapted to be fastened on a bicycle handlebar next to a handle element,
   wherein
   the control element comprises an actuation element rotatable on a bearing element, said actuation element being adapted to be turned from a rest position to at least one activation position,
   a return element is provided for turning the actuation element from the at least one activation position back to the rest position, and
   a retaining element that retains the actuation element in the rest position, wherein the actuation element is adapted to be turned, in respectively opposite directions, from the rest position to a first activation position and a second activation position, and wherein the return element comprises two spring elements, a first spring element being provided for the return from the first activation position to the rest position, and a second spring element for the return from the second activation position to the rest position.

2. The bicycle handle system of claim 1, wherein the first and second spring elements are arranged between the actuation element and the bearing element or the actuation element and a fixing element fastened on the bicycle handlebar.

3. The bicycle handle system of claim 1, wherein the return element is arranged in a circumferential direction of the actuation element and/or the bearing element.

4. The bicycle handle system of claim 1, wherein the retaining element comprises a retaining pin which, in the rest position, is situated in a retaining depression.

5. The bicycle handle system of claim 4, wherein the retaining pin is spring-loaded towards the retaining depression.

6. The bicycle handle system of claim 4, wherein the retaining pin is arranged on the bearing element or on the fixing element and the retaining depression is arranged in the actuation element.

7. The bicycle handle system of claim 3, wherein one or both spring elements are arranged in a circumferential direction of the actuation element and/or the bearing element.

8. A bicycle handle system comprising:
   a control element for controlling an electric auxiliary motor, said element being adapted to be fastened on a bicycle handlebar next to a handle element,
   wherein
   the control element comprises an actuation element rotatable on a bearing element, said actuation element being adapted to be turned from a rest position to at least one activation position, and
   a return element is provided for returning the actuation element from the at least one activation position back to the rest position, wherein the actuation element is adapted to be turned, in respectively opposite directions, from the rest position to a first activation position and a second activation position, and wherein the return element comprises two spring elements, a first spring element being provided for the return from the first activation position to the rest position, and a second spring element for the return from the second activation position to the rest position.

9. The bicycle handle system of claim 8, wherein the return element comprises a spring element arranged between the actuation element and the bearing element or the actuation element and a fixing element fastened on the bicycle handlebar.

10. The bicycle handle system of claim 8, wherein one or both spring elements are arranged in a circumferential direction of the actuation element and/or the bearing element.

11. The bicycle handle system of claim 8, further comprising a retaining element that retains the actuation element in the rest position, wherein the retaining element comprises a retaining pin which, in the rest position, is situated in a retaining depression.

12. The bicycle handle system of claim 11, wherein the retaining pin is spring-loaded towards the retaining depression.

13. The bicycle handle system of claim 11, wherein the retaining pin is arranged on the bearing element or on the fixing element and the retaining depression is arranged in the actuation element.

* * * * *